United States Patent
Takahashi et al.

(10) Patent No.: US 9,384,563 B2
(45) Date of Patent: Jul. 5, 2016

(54) IMAGE PROCESSING DEVICE, METHOD, AND COMPUTER PROGRAM PRODUCT

(75) Inventors: Shihomi Takahashi, Kanagawa (JP); Masashi Nishiyama, Kanagawa (JP); Tomoyuki Shibata, Kanagawa (JP); Makoto Hirohata, Kanagawa (JP); Masahiro Sekine, Tokyo (JP); Kaoru Sugita, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 544 days.

(21) Appl. No.: 13/535,952

(22) Filed: Jun. 28, 2012

(65) Prior Publication Data

US 2013/0033591 A1   Feb. 7, 2013

(30) Foreign Application Priority Data

Aug. 4, 2011 (JP) .................................. 2011-171272

(51) Int. Cl.
| | |
|---|---|
| H04N 7/18 | (2006.01) |
| G06T 11/00 | (2006.01) |
| G06K 9/50 | (2006.01) |
| G06K 9/48 | (2006.01) |

(52) U.S. Cl.
CPC . *G06T 11/00* (2013.01); *G06K 9/50* (2013.01); *G06K 9/48* (2013.01)

(58) Field of Classification Search
CPC ......... G06T 2210/62; G06K 9/50; G06K 9/48
USPC .......... 348/46, 51, 61, 77, 150; 382/207, 209, 382/217–220
See application file for complete search history.

(56) References Cited

U.S. PATENT DOCUMENTS

| | | | |
|---|---|---|---|
| 7,308,332 B2 | 12/2007 | Okada et al. | |
| 7,433,753 B2 | 10/2008 | Okada et al. | |
| 2006/0171590 A1* | 8/2006 | Lu et al. ........................ | 382/190 |
| 2007/0040033 A1* | 2/2007 | Rosenberg ............... | 235/462.36 |

(Continued)

FOREIGN PATENT DOCUMENTS

| | | | |
|---|---|---|---|
| JP | 2005-216094 | | 8/2005 |
| JP | 2005216094 A | * | 8/2005 |
| JP | 2008181261 A | * | 8/2008 |

OTHER PUBLICATIONS

Office Action dated Apr. 14, 2015 in counterpart Japanese Patent Application No. 2014-136075 (which is a divisional of Japanese Patent Application No. 2011-171272) and English-language translation thereof.

*Primary Examiner* — Andy Rao
(74) *Attorney, Agent, or Firm* — Nixon & Vanderhye, P.C.

(57) ABSTRACT

In an embodiment, an image processing device includes: a first calculating unit; a selecting unit; an extracting unit; a second calculating unit; a determining unit; and a generating unit. The first calculating unit calculates posture information of a subject from a first image including the subject. The selecting unit selects a second image associated with the posture information from a plurality of second images including clothing. The extracting unit extracts a first feature of the subject from a first contour in the first image and extracts a second feature from a second contour in the second image. The second calculating unit calculates a first difference between the first feature and the second feature. The determining unit determines a transparency that is higher as the first difference is larger. The generating unit generates a composite image combining the first image and the second image with the determined transparency.

19 Claims, 16 Drawing Sheets

(56) References Cited

U.S. PATENT DOCUMENTS

| | | | |
|---|---|---|---|
| 2008/0030459 A1* | 2/2008 | Kouno | 345/156 |
| 2008/0285887 A1* | 11/2008 | Wanda et al. | 382/284 |
| 2009/0115777 A1* | 5/2009 | Reyers Moreno | 345/419 |
| 2011/0096183 A1* | 4/2011 | Robertson | 348/222.1 |

\* cited by examiner

FIG.2
| CLOTHING NUMBER | POSTURE INFORMATION | SECOND IMAGE INFORMATION | CLOTHING INFORMATION |
|---|---|---|---|
|  |  |  |  |
|  |  |  |  |
|  |  |  |  |
⋮
FIG.3A
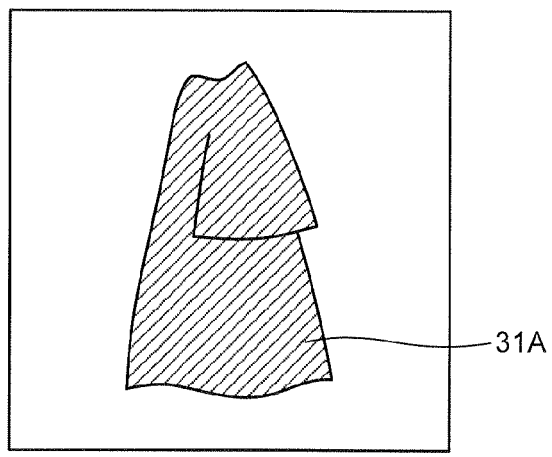
FIG.3B
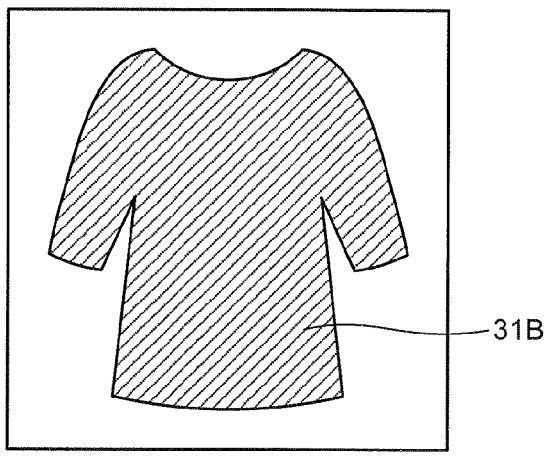

FIRST IMAGE

FIRST CONTOUR

FIRST FEATURE

SECOND IMAGE

SECOND CONTOUR

SECOND FEATURE

COMBINED IMAGE

COMPOSITE IMAGE

COMPOSITE IMAGE

FIRST CONTOUR

FIRST FEATURE

DIVIDE FIRST FEATURE

SECOND CONTOUR

SECOND FEATURE

DIVIDE SECOND FEATURE

COMPOSITE IMAGE

COMPOSITE IMAGE

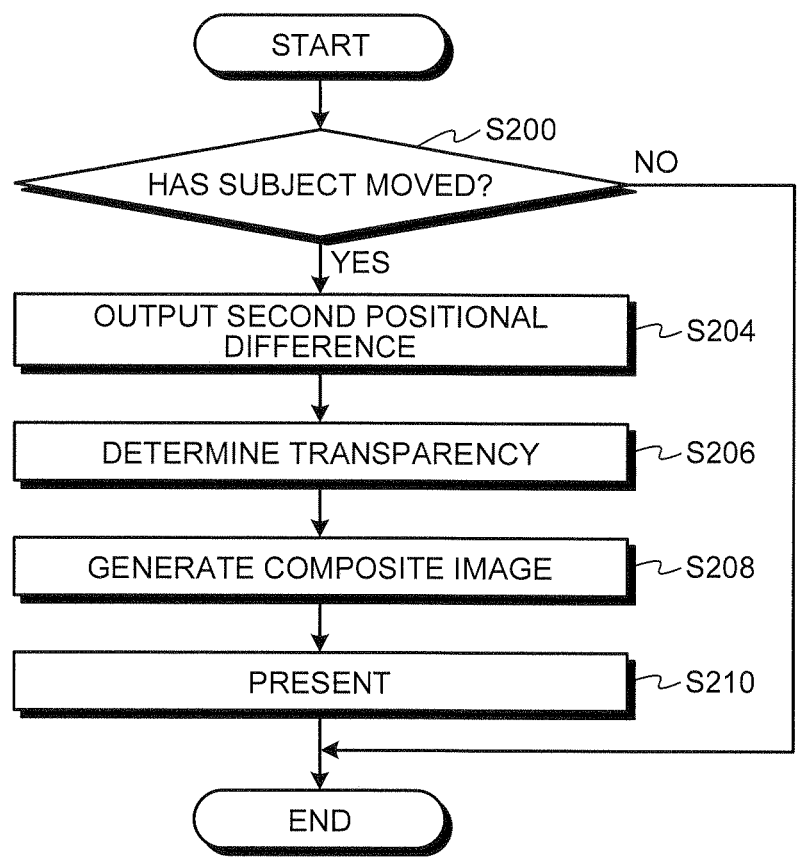

COMPOSITE IMAGE

IMAGE PROCESSING DEVICE, METHOD, AND COMPUTER PROGRAM PRODUCT

CROSS-REFERENCE TO RELATED APPLICATION

This application is based upon and claims the benefit of priority from Japanese Patent Application No. 2011-171272, filed on Aug. 4, 2011; the entire contents of which are incorporated herein by reference.

FIELD

Embodiments described herein relate generally to an image processing device, a method therefor and a computer program product therefor.

BACKGROUND

Various technologies for displaying a virtual image representing a state in which clothing to be tried on is worn have been disclosed. For example, proposed is a technology for: extracting feature points of an image of a subject that is to try clothing on and feature points of an image of the clothing; transforming the image of the clothing so that the feature points thereof correspond to those of the image of the subject; and then displaying a composite image combining the transformed image of the clothing and the image of the subject.

In the related art, however, if the posture of the clothing in the worn state and the posture of the subject are different, there occurs a positional mismatch between the image of the clothing to be tried on and the image of the subject, and it has been difficult to present a composite image that looks natural.

BRIEF DESCRIPTION OF THE DRAWINGS

FIG. 2 is a diagram of an example of a table storing second image information according to the first embodiment;

FIGS. 3A and 3B are diagrams of an example of a second image according to the first embodiment;

FIG. 9 is a flowchart of image processing according to the second embodiment;

DETAILED DESCRIPTION

In an embodiment, an image processing device includes: a first calculating unit; a selecting unit; an extracting unit; a second calculating unit; a determining unit; and a generating unit. The first calculating unit is configured to calculate posture information of a subject from a first image including the subject. The selecting unit is configured to select a second image associated with the posture information from a plurality of second images including clothing. The extracting unit is configured to extract a first feature of the subject from a first contour in the first image and extract a second feature from a second contour in the second image. The second calculating unit is configured to calculate a first difference between the first feature and the second feature. The determining unit is configured to determine a transparency that is higher as the first difference is larger. The generating unit is configured to generate a composite image combining the first image and the second image with the transparency changed to the determined transparency.

Embodiments of an image processing device, a method, and a computer program product therefor will be described below in detail with reference to the accompanying drawings.

First Embodiment

Figure 1:
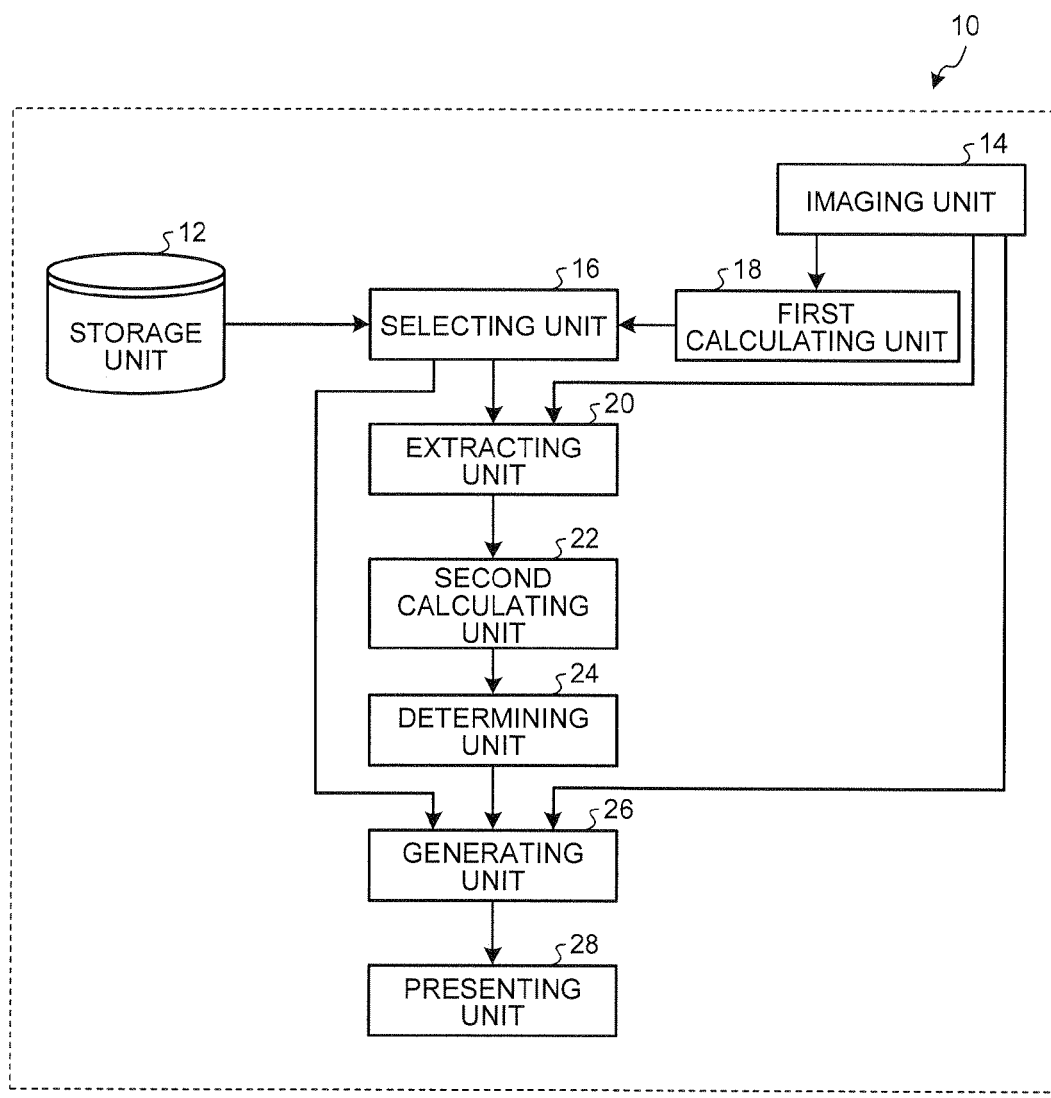
FIG. 1 is a block diagram of an image processing device according to a first embodiment.

FIG. 1 is a block diagram illustrating a functional configuration of an image processing device 10 according to this embodiment. The image processing device 10 includes a storage unit 12 (storing unit), an imaging unit 14 (imaging unit), a selecting unit 16 (selecting unit), a first calculating unit 18 (first calculating unit), an extracting unit 20 (extracting unit), a second calculating unit 22 (second calculating unit), a determining unit 24 (determining unit), a generating unit 26 (generating unit) and a presenting unit 28 (presenting unit).

The imaging unit 14 images a subject that is to try clothing on. A known digital camera, digital video camera or the like may be used as the imaging unit 14. The imaging unit 14 acquires a first image including the subject by capturing the subject. The imaging unit 14 outputs the first image to the first calculating unit 18, the extracting unit 20 and the generating unit 26.

The subject to try clothing on is not limited to a human but examples thereof also include a pet such as a dog and a cat, and a mannequin or the like that is a model of a human body or a pet. Clothing is an article that can be worn by the subject. Examples of the clothing include a jacket, a skirt, trousers, shoes and a hat.

The first calculating unit 18 calculates posture information of the subject from the first image acquired by the imaging unit 14. The posture information represents posturing of the body of the subject, the orientation and the motion of the subject, and the like. The orientation of the subject represents the orientation of the subject with respect to the imaging unit 14 at the time of capturing. Examples of the orientation of the subject include a front direction in which the face and the body face the front with respect to the imaging unit 14, a side direction in which the face and the body face the side with respect to the imaging unit 14, and directions other than the front direction and the side direction. The motion of the subject represents a shape of the body defined by a set of joint angles of the subject.

Although a case where the first calculating unit 18 calculates posture information representing the orientation of the subject as the posture information will be described in this embodiment, the calculation is not limited thereto.

A known method can be applied to the calculation of the posture information by the first calculating unit 18. For example, a method of extracting a face area in the first image by a known method and determining the orientation of the face area by a known method to calculate the posture information representing the orientation of the subject may be used for the calculation of the posture information. Alternatively, the posture information may be stored in advance in association with information representing the size and the shape of the contour of the subject in the first image. Then, the first calculating unit 18 may calculate the posture information by extracting the contour in the first image by a known method and reading posture information associated with the information representing the size and the shape of the contour. Alternatively, the imaging unit 14 may capture the subject in a state in which the subject is wearing clothing with a mark on each of a plurality of divided regions. Then, the posture information may be calculated by using calculation results obtained by calculating positions of mark images representing the marks in the first image acquired by capturing.

Still alternatively, the posture information may be calculated by using a posture estimating method disclosed in Japanese Patent Application Laid-Open No. 2006-249618. Specifically, a method of calculating the posture information as follows may be used: the posture information is stored in advance in association with information representing a three-dimensional body shape of the subject; a contour of the first image acquired by capturing by the imaging unit 14 is then extracted by a known method; a subject model is then generated for each pieces of information representing the three-dimensional body shape associated with each pieces of posture information, and the subject model is projected onto a two-dimensional image to extract the contour; and the posture information associated with a subject model with a contour consistent with or the most similar to the contour of the first image is read.

The storage unit 12 stores second image information representing a second image. The second image information preferably represents an image of the subject that is to try clothing on or an image of the clothing captured in a state tried on a dummy such as a mannequin that is a model of the subject.

In this embodiment, a case in which the storage unit 12 stores a table storing the second image information, will be described. FIG. 2 illustrates an example of a data structure of the table storing the second image information stored in the storage unit 12.

As illustrated in FIG. 2, the table storing the second image information stores a clothing number, the posture information, the second image information and clothing information in association with one another, for example. The clothing number is information such as a number or the like uniquely assigned to each article of clothing. Accordingly, the description will be made assuming that the same clothing number is assigned to the same article of clothing even if different pieces of posture information are associated. The posture information is described above, and the description thereof will not be repeated here. The second image information is image information representing the second image. The clothing information is information representing the clothing, and includes information such as the name, the color, the size, the material and the price of the clothing, for example.

The storage unit 12 may store a plurality of pieces of posture information of different postures and pieces of second image information and clothing information associated with the respective pieces of posture information for one article of clothing (clothing number), or may store posture information of one posture for one article of clothing.

In a case where the storage unit 12 stores a plurality of pieces of posture information of different postures and pieces of second image information associated with the respective pieces of posture information for one article of clothing, the storage unit 12 stores a second image 31A captured from the side of an article of clothing and posture information representing the side direction in association with the clothing number representing the article of clothing as illustrated in FIG. 3A, for example. The storage unit 12 also stores a second image 31B captured from the front of the same article of clothing and posture information representing the front direction in association with the clothing number of the same article of clothing as illustrated in FIG. 3B.

The table storing the second image information in the storage unit 12 needs to store at least the clothing number for identifying an article of clothing, the posture information and the second image information and may be in a form that the clothing information is not stored.

The description is continued referring back to FIG. 1. The selecting unit 16 selects the second image information, associated with the posture information received from the first calculating unit 18, from the storage unit 12. In a case where a plurality of pieces of second image information associated with the posture information is stored in the storage unit 12, that is, in a case where different articles of clothing associated with the same posture information are stored in the storage unit 12, the selecting unit 16 selects one piece of second image information out of the pieces of second image information.

Alternatively, the image processing device 10 may include an operating unit, which is not illustrated, and the selecting unit 16 may select a piece of second image information associated with the posture information received from the first calculating unit 18 out of pieces of second image information for the clothing number selected by an operation instruction from the operating unit entered by the user. The operating unit may be a known input device for inputting various information such as a key board and a touch panel.

The selecting unit 16 outputs the selected piece of second image information to the extracting unit 20 and the generating unit 26.

The extracting unit 20 extracts the contour (referred to as a first contour) of the first image, and extracts a first feature of the subject from the first contour. The extracting unit 20 also extracts the contour (referred to as a second contour) of the second image, and extracts a second feature from the second contour.

The first feature and the second feature represent parts characterizing the subject. Specifically, the first feature and the second feature represent at least one of the shoulder and the lower back of the subject. Note that the first feature and the second feature may be any part that characterizes the subject and may include the neck, the chest, the arms, the knees, the thighs, the head, the ankles or the toes, for example. In the following description, the first feature and the second feature may be simply referred to as a feature when these are collectively referred to.

The extracting unit 20 extracts the first contour in the first image and the second contour in the second image by using edge extraction employing a known edge extraction method. Specifically, examples of the edge extraction include the Canny edge detector, the Sobel operator, the Prewitt operator method, and the Roberts' Cross operator, but the edge extraction is not limited thereto.

The following method is used for a method for extracting the first feature from the first contour and a method for extracting the second feature from the second contour. For example, the extracting unit 20 stores in advance identification information for identifying a line image part representing a feature in a contour. An example of the identification information is information representing the curvature, but the identification information is not limited thereto.

An example of a method for extracting the first feature and the second feature by using the curvature as the identification information will be described. For example, the extracting unit 20 stores in advance information representing a range of the curvature for each of the features such as the shoulder, the lower back and the like. Specifically, the extracting unit 20 stores a range of the curvature of a curve corresponding to the shoulder in association with information representing the shoulder. The extracting unit 20 also stores in advance ranges of the curvature for the lower back and other parts in the same manner.

The extracting unit 20 then calculates the curvature for each of a plurality of regions into which the first feature and the second feature are divided, and if information representing a feature associated with the calculated curvature is stored, the extracting unit 20 extracts the region with the curvature as a line image (the first feature, the second feature).

A known method is used for the calculation of the curvature. For example, the extracting unit 20 calculates the curvature by the following method. Specifically, the extracting unit 20 first obtains a covariance matrix M (Equation (1)) of the contours (the first contour, the second contour) of a neighborhood S(p) near a pixel of interest.

$$M = \begin{bmatrix} \sum_{S(p)} \left(\frac{dI}{dx}\right)^2 & \sum_{S(p)} \left(\frac{dI}{dxdy}\right)^2 \\ \sum_{S(p)} \left(\frac{dI}{dxdy}\right)^2 & \sum_{S(p)} \left(\frac{dI}{dy}\right)^2 \end{bmatrix} \quad (1)$$

In the equation (1), M represents the covariance matrix of the contours (the first contour, the second contour) and S(p) represents the neighborhood near the pixel of interest. In addition, in the equation (1), dI/dx represents a differential operator in the horizontal direction and dI/dy represents a differential operator in the vertical direction.

The extracting unit 20 then calculates the curvature by the following equation (2) by using eigenvalues ($\lambda 1$, $\lambda 2$) of the covariance matrix M:

$$\text{Curvature} = \alpha\lambda 1 + \beta\lambda 2 \quad (2)$$

In the equation (2), $\alpha$ is a constant representing the significance of the eigenvalue $\lambda 1$. In addition, in the equation (2), $\beta$ is a constant representing the significance of the eigenvalue $\lambda 2$.

Note that depth information representing the depth of the subject and color information of the image may also be used as the identification information for identifying the line image part representing the feature in the contour in addition to the curvature described above.

When the depth information is used as the identification information in addition to the curvature, the imaging unit 14 is configured to further acquire the depth information representing the depth of the subject. In this case, the imaging unit 14 includes a known device for acquiring the depth. Examples of such a known device for acquiring the depth include an active sensor and a stereo camera. In this case, the imaging unit 14 outputs the depth information together with the first image to the extracting unit 20.

In this case, the extracting unit 20 stores in advance information representing the curvature range for each of the features such as the shoulder and the lower back and the depth information. The extracting unit 20 then calculates the curvature for each of a plurality of regions into which the first feature and the second feature are divided and reads the depth information, and if information representing a feature associated with the calculated curvature and the read depth information is stored, the extracting unit 20 extracts the region with the curvature and the depth as a feature (the first feature, the second feature).

When the color information is used as the identification information in addition to the curvature, the extracting unit 20 stores in advance information representing the curvature range and a range of difference in color value between adjacent pixels for each of the features such as the shoulder and the lower back. Specifically, the extracting unit 20 stores the curvature range of a curve corresponding to the shoulder and the range of the color value difference corresponding to the shoulder in association with information representing the shoulder. The extracting unit 20 also stores in advance ranges of the curvature and ranges of the color value difference for the lower back and other parts in the same manner. The extracting unit 20 then calculates the curvature for each of a plurality of regions into which the first feature and the second feature are divided, and calculates the color value difference between adjacent pixels. If information representing a feature associated with the calculated curvature and the calculated color value difference is stored, the extracting unit 20 then extracts the region with the curvature and the color value difference as a feature (the first feature, the second feature).

Other methods may be used for the process of extracting the first feature and the second feature. For example, the first feature and the second feature may be extracted as follows: the imaging unit 14 captures an article of clothing with a feature such as the shoulder marked with a first mark and the subject wearing belt-like clothing marked with a second mark; and the extracting unit 20 then extracts the shoulder by reference to the first position of the first mark in the first image information acquired by capturing, and extracts the lower back by reference to the second position of the second mark.

Figure 4A:
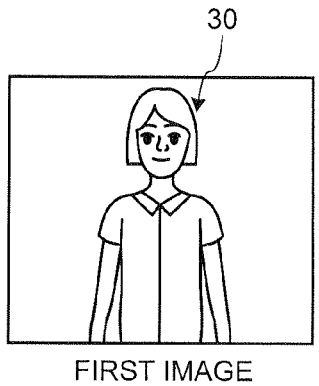
FIGS. 4A to 4G are diagrams of an example of a composite image according to the first embodiment.
Figure 4B:
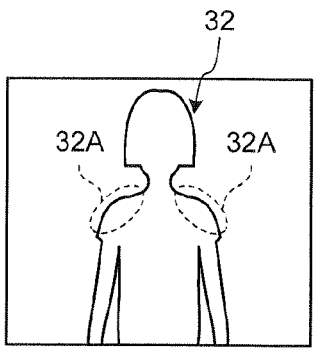

FIGS. 4A to 4G illustrate an example of image combining in the image processing device 10 according to this embodiment. It is assumed, for example, that the first image captured by the imaging unit 14 is a first image 30 as illustrated in FIG. 4A, and that the second image information selected by the selecting unit 16 is a second image 36 illustrated in FIG. 4D. In this case, the extracting unit 20 extracts a first contour 32 illustrated in FIG. 4B, for example, as the first contour in the first image 30, for example. The extracting unit 20 also extracts a second contour 38 illustrated in FIG. 4E as the second contour of the second image 36, for example.

Figure 4C:
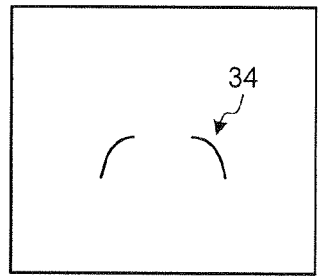
Figure 4D:
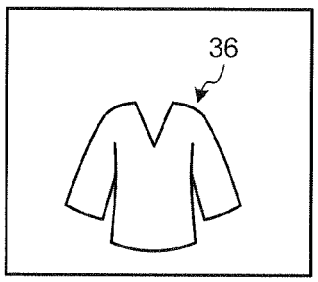
Figure 4E:
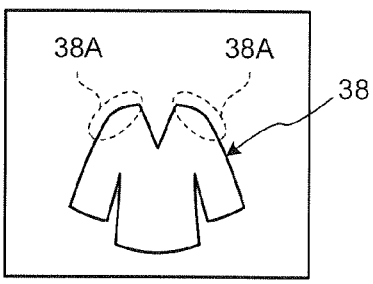
Figure 4F:
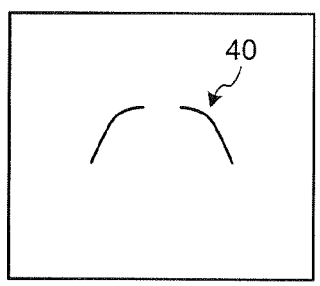
Figure 4G:
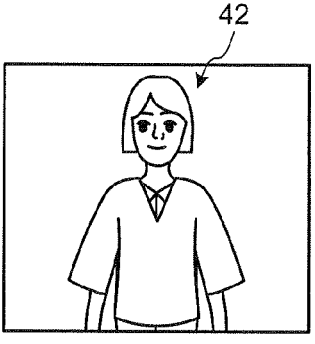

The extracting unit 20 then extracts a first feature 34 corresponding to a shoulder 32A, for example, that is a feature point in the first contour 32 (see FIG. 4C). Similarly, the extracting unit 20 extracts a second feature 40 corresponding to a shoulder 38A in the second contour 38 (see FIG. 4F). Then, the generating unit 26, which will be described later, generates a composite image 42 combining the second image with its transparency changed and the first image (see FIG. 4G).

The description is continued referring back to FIG. 1. The extracting unit 20 outputs the first feature extracted from the first contour in the first image and the second feature extracted from the second contour in the second image to the second calculating unit 22.

The second calculating unit 22 calculates a difference (hereinafter referred to as a first difference) between the first feature and the second feature received from the extracting unit 20.

A known calculation method is used for calculation of the difference between the first feature and the second feature. Examples of the method for calculating the difference between the first feature and the second feature include the chamfer matching method, the level set approach and the simple similarity method.

More specifically, the second calculating unit 22 calculates a sum of the differences between pixel positions of pixels constituting the first feature and pixel positions of pixels constituting the second feature as the first difference, for example.

Preferably, the second calculating unit 22 first makes the first feature and the second feature correspond to each other for calculation of the first difference. Specifically, the second calculating unit 22 enlarges, reduces or shifts the position of either one of the first feature and the second feature, and calculates the difference between the first feature and the second feature resulting from the change each time the enlargement, reduction or positional shift is performed. The second calculating unit 22 then repeats the change process and the difference calculating process a predetermined number of times, and calculates the minimum one of the calculated differences as the first difference between the first feature and the second feature. The number of times the change process and the difference calculating process are repeated may be determined and stored in the second calculating unit 22 in advance.

The second calculating unit 22 outputs the calculated first difference to the determining unit 24.

The determining unit 24 determines a transparency that is higher as the first difference is larger as the transparency of the second image. For example, the determining unit 24 stores in advance a calculation formula for calculating the transparency that is higher as the first difference is larger or a table defining the first difference and the transparency as the transparency with respect to the first difference. The determining unit 24 then calculates the transparency by substituting the first difference received from the second calculating unit 22 into the calculation formula or reads the transparency associated with the first difference to determine the transparency.

Note that the determining unit 24 only needs to determine the transparency that is higher as the first difference is larger, and may determine the transparency by using a formula or a table linearly representing the relation between the first difference and the transparency or may determine the transparency by using a formula or a table representing the relation by a quadratic curve. Alternatively, the determining unit 24 may determine the transparency that is higher in a continuous manner as the first difference is larger or may determine the transparency that is higher in stages as the first difference is larger.

The determining unit 24 outputs the transparency determined as the transparency of the second image to the generating unit 26.

The generating unit 26 receives transparency information representing the transparency from the determining unit 24. The generating unit 26 also receives the second image information from the selecting unit 16. The generating unit 26 also receives the first image from the imaging unit 14. The generating unit 26 then changes the transparency of the second image information received from the selecting unit 16 to the transparency received from the determining unit 24.

The generating unit 26 then combines the second image of the second image information with the changed transparency with the first image of the first image information received from the imaging unit 14 to generate a composite image.

Specifically, the generating unit 26 generates the composite image by calculating pixel values of a region where the second image and the first image overlap with each other in the composite image by using the following equation (3):

$$Io = \alpha \cdot \beta \cdot Ih + (1-\alpha)(1-\beta) \cdot Ic \qquad (3)$$

In the equation (3), Io represents a pixel value in the region where the second image and the first image overlap with each other in the composite image. In addition, Ih represents a pixel value in the overlapping region in the first image. Ic represents a pixel value in the overlapping region in the second image. Furthermore, in the equation (3), $\alpha$ represents the transparency determined by the determining unit 24. In the equation (3), $\beta$ represents the transparency (before combining the images) of the second image to be combined.

In the equation (3), $\alpha$ and $\beta$ represent the transparencies where the maximum value of the transparencies is "1" and the minimum value thereof is "0".

The generating unit 26 then outputs composite image information of the generated composite image to the presenting unit 28.

The presenting unit 28 receives the composite image information from the generating unit 26. The presenting unit 28 is a device configured to present a composite image. In this embodiment, presentation refers to display, printing, transmitting and the like. Examples of the presenting unit 28 include a display device such as a liquid crystal display, a printing device for printing images, and a known communication device for transmitting information to external devices through wire communication or wireless communication. When the presenting unit 28 is a display device, the presenting unit 28 displays the received composite image of the composite image information. When the presenting unit 28 is a communication device, the presenting unit 28 transmits the composite image information to an external device. When the presenting unit 28 is a printing device, the presenting unit 28 prints the composite image of the composite image information.

Next, image processing performed by the image processing device 10 according to this embodiment will be described.

Figure 5:
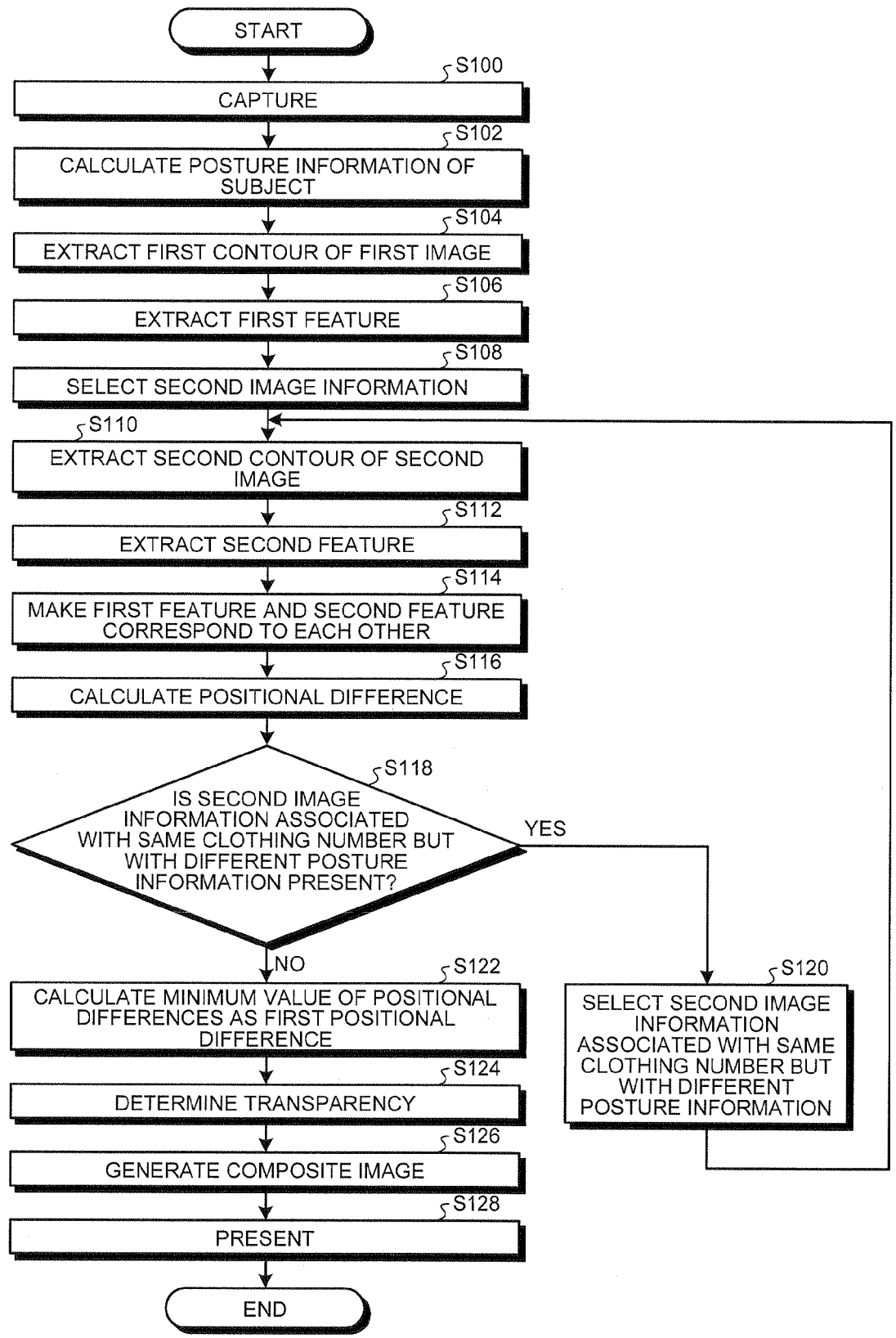
FIG. 5 is a flowchart of image processing according to the first embodiment.

FIG. 5 is a flowchart illustrating procedures of image processing performed by the image processing device 10 according to this embodiment.

First, the imaging unit 14 acquires a first image by capturing a subject (step S100). Next, the first calculating unit 18 calculates posture information of the subject from first image information of the first image acquired by capturing by the imaging unit 14 (step S102).

Next, the extracting unit 20 extracts a first contour in the first image information acquired by capturing in step S100 and extracts a first feature from the first contour (step S104, step S106).

Next, the selecting unit 16 selects one piece of second image information associated with the posture information calculated in step S102 described above from the storage unit 12 (step S108).

Next, the extracting unit 20 extracts a second contour in the second image information selected in step S108 and extracts a second feature from the second contour (step S110, step S112).

Next, the second calculating unit 22 makes the first feature extracted in step S106 and the second feature extracted in step S112 correspond to each other, and calculates the minimum value of the differences calculated by corresponding the features to each other (enlargement, reduction or positional shift of the first feature and the second feature) (step S114, step S116).

Next, the second calculating unit 22 determines whether or not a piece of second image information for which the difference is not calculated and which is associated with the same clothing number as the second image information used for extraction of the second contour in step S110 described above but with different posture information is stored in the storage unit 12 (step S118). If a piece of second image information for which the difference is not calculated and which is associated with the same clothing number but with different posture information is stored, the second calculating unit 22 makes a positive determination (Yes in step S118). The second calculating unit 22 then selects one piece of second image information associated with the clothing number of the second image information used for extraction of the second contour in step S110 but with different posture information from the second image information from the storage unit 12, and then returns to step S110 described above (step S120).

If the second calculating unit 22 makes a negative determination in step S118 (No in step S118), the second calculating unit 22 calculates the minimum value of the differences calculated in the processes of steps S110 to S120 described above as a first difference (step S122).

Next, the determining unit 24 determines a transparency that is higher as the first difference is larger on the basis of the first difference calculated in step S122 (step S124).

Next, the generating unit 26 changes the transparency of the second image information associated with the second feature used for the calculation of the first difference calculated by the process of step S122 described above to the transparency determined in step S124, and generates a composite image combining the second image information with the changed transparency and the first image information (step S126).

Next, the presenting unit 28 presents the composite image generated in step S126 (step S128).

The processes in steps S108 to S112 may be performed as interrupt processing interrupting during the processes of steps S100 to S106 at every predetermined time.

The image processing device 10 generates a composite image as illustrated in FIGS. 6A to 6E, for example, and presents the composite image on the presenting unit 28 by performing the image processing represented by steps S100 to S128 described above.

Figure 6A:
FIGS. 6A to 6E are diagrams of an example of a composite image according to the first embodiment.
Figure 6B:
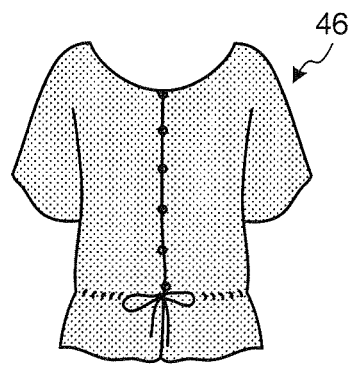
Figure 6C:
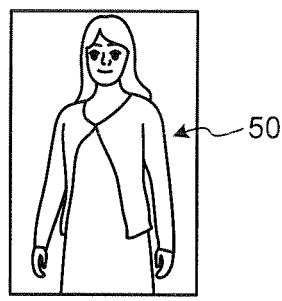

FIGS. 6A to 6E illustrates an example of image combining in the image processing device 10 according to this embodiment. It is assumed, for example, that the first image captured by the imaging unit 14 is a first image 50 acquired by capturing the subject from the front as illustrated in FIG. 6C and that the second image information selected by the selecting unit 16 is a second image 46 acquired by capturing the second image from the front as illustrated in FIG. 6B. It is also assumed that the first difference calculated by the second calculating unit 22 is a value associated with a transparency "0" (the minimum value of the transparency). It is also assumed that the transparency of the first image acquired by capturing by the imaging unit 14 is a transparency "0". In this case, the image processing device 10 generates a composite image 52 in which the second image 46 with the transparency "0" is superimposed on the first image 50 with the transparency "0", for example, by performing the image processing described above, and presents the composite image 52 on the presenting unit 28 (see FIG. 6E).

Figure 6D:
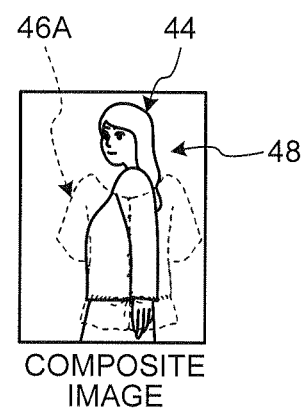
Figure 6E:
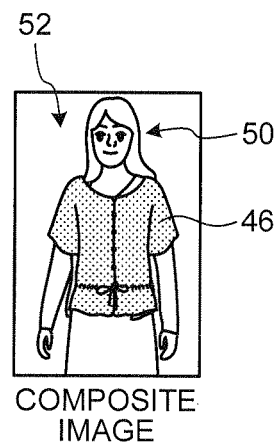

As another example, it is assumed that the first image captured by the imaging unit 14 is a first image 44 acquired by capturing the subject from the side as illustrated in FIG. 6A and that the second image information selected by the selecting unit 16 is the second image 46 acquired by capturing the second image from the front as illustrated in FIG. 6B. In this case, the first difference between the first feature and the second feature is larger than the first difference used for generation of the composite image illustrated in FIG. 6E. In this case, it is assumed, for example, that the first difference calculated by the second calculating unit 22 is a value associated with a transparency "1" (the maximum value of the transparency). It is also assumed that the transparency of the first image acquired by capturing by the imaging unit 14 is a transparency "0". In this case, the image processing device 10 generates a composite image 48 in which a second image 46A with the transparency "1" is superimposed on the first image 44 with the transparency "0", for example, by performing the image processing described above, and presents the composite image 48 on the presenting unit 28 (see FIG. 6D). Accordingly, the second image 46A is presented in a transparent state in the composite image 48 as illustrated in FIG. 6D.

In addition, although not illustrated, since the transparency of the second image to be combined with the first image is higher as the first difference is larger, the second image with a higher transparency is combined with the first image as the first difference becomes larger in the range from the case of the composite image 52 to that of the composite image 48.

As described above, the image processing device 10 according to this embodiment determines a transparency that is higher as the first difference representing a difference between the first feature extracted from the first contour in the first image and the second feature extracted from the second contour in the second image is larger, and presents a composite image obtained by combining the first image and the second image with its transparency changed to the determined transparency.

Thus, when the posture of clothing in a worn state and the posture of the subject are different, the image processing device 10 according to this embodiment combines the second image with a transparency that is higher as the difference in posture is greater, that is, as the first difference is larger. As a result, a composite image that looks natural can be presented.

In this embodiment, the case in which the second calculating unit 22 calculates the first difference between the first feature and the second feature is described. The second calculating unit 22, however, may divide each of the first feature and the second feature into a plurality of linear regions and calculate the first difference for each linear region. The determining unit 24 then determines, for each of a plurality of regions including the linear regions in the second image, a transparency that is higher as the first difference in the linear region included in each region is larger. Then, the generating unit 26 may generate a composite image combining the second image with the transparencies of the regions changed to the determined transparencies with the first image.

FIGS. 7A to 7H illustrate an example of image combining in the image processing device 10 according to this embodiment. It is assumed that the extracting unit 20 has extracted a first contour 53 illustrated in FIG. 7A, for example, as the first contour in the first image and has extracted a first feature 54 illustrated in FIG. 7B. It is also assumed that the extracting unit 20 has extracted a second contour 56 illustrated in FIG. 7D, for example, as the second contour in the second image and has extracted a second feature 57 illustrated in FIG. 7E.

Figure 7A:
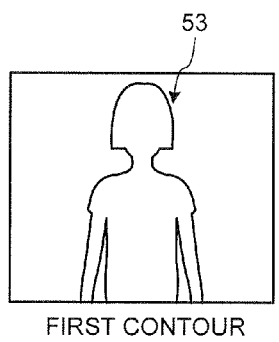
FIGS. 7A to 7H are diagrams of an example of a composite image according to the first embodiment.
Figure 7B:
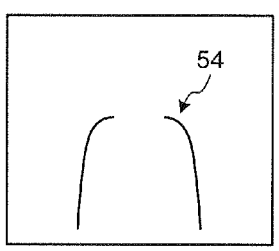
Figure 7C:
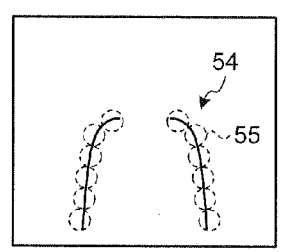
Figure 7D:
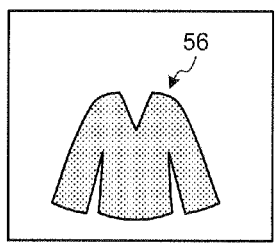
Figure 7E:
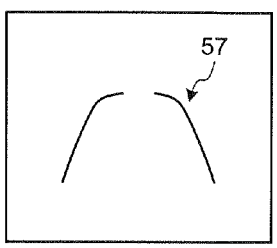
Figure 7F:
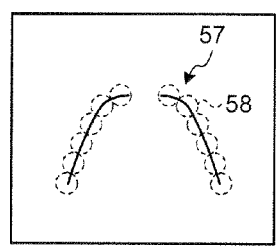

The second calculating unit 22 then divides the first feature 54 into a plurality of linear regions 55 (see FIG. 7C), and divides the second feature 57 into a plurality of linear regions 58 (see FIG. 7F). The determining unit 24 then determines, for each of a plurality of regions including the linear regions in the second image, a transparency that is higher as the first difference in the linear region included in each region is larger.

Figure 7G:
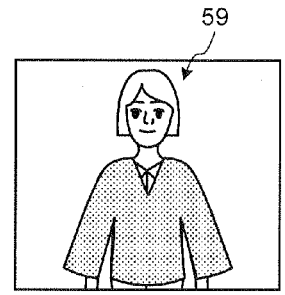
Figure 7H:
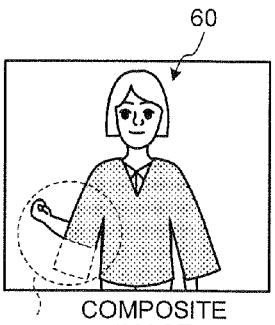

Then, when the first differences of the linear regions, into which the first feature and the second feature are divided, are those associated with the minimum value "0" of the transparency, for example; the generating unit 26 generates a composite image 59 combining the second image with the transparency "0" with the first image (see FIG. 7G). On the other hand, it is assumed that the first differences of linear regions corresponding to the forearm of the subject out of a plurality of linear regions, into which the first feature and the second feature are divided, are differences associated with the maximum value "1" of the transparency. It is also assumed that the first differences of the other regions are differences associated with the minimum value "0" of the transparency. In this case, the generating unit 26 generates a composite image 60 combining the second image with the transparency of the region including the linear region corresponding to the forearm in the second image changed to the transparency "1" and the transparencies of the other regions changed to the transparency "0" with the first image with the transparency "0" (see FIG. 7H). Thus, if the first difference from the second image at the forearm of the subject is large, for example, the composite image is an image combining the second image with a high transparency at the forearm according to the first difference. As a result, a composite image that looks more natural can be presented.

In this embodiment, it is described that the extracting unit 20 extracts the first contour in the first image and the second contour in the second image by using edge extraction employing a known edge extraction method as described above, and that the extracting unit 20 then extracts the first feature on the basis of the curvature of the first contour and extracts the second feature on the basis of the curvature of the second contour.

The filter size used for the edge extraction and the adjacent region used for the curvature calculation may be fixed but are preferably adjusted according to the following proportions. Specifically, the extracting unit 20 preferably enlarges at least one of the filter size and the size of the adjacent region as the proportion of the first image representing the subject in a captured image acquired by capturing by the imaging unit 14 is larger.

As a result of enlarging at least one of the filter size and the size of the adjacent region as the proportion of the first image in the captured image is larger; it is possible to extract each of the first contour, the second contour, the first feature and the second feature at high accuracy even if the proportion of the first image in the captured image is changed by movement of the subject or the like.

Second Embodiment

In this embodiment, a plurality of first images captured at different imaging times are acquired, and the transparency is further adjusted according to a difference in a first feature between successive first images when it is determined that the subject has moved.

Figure 8:
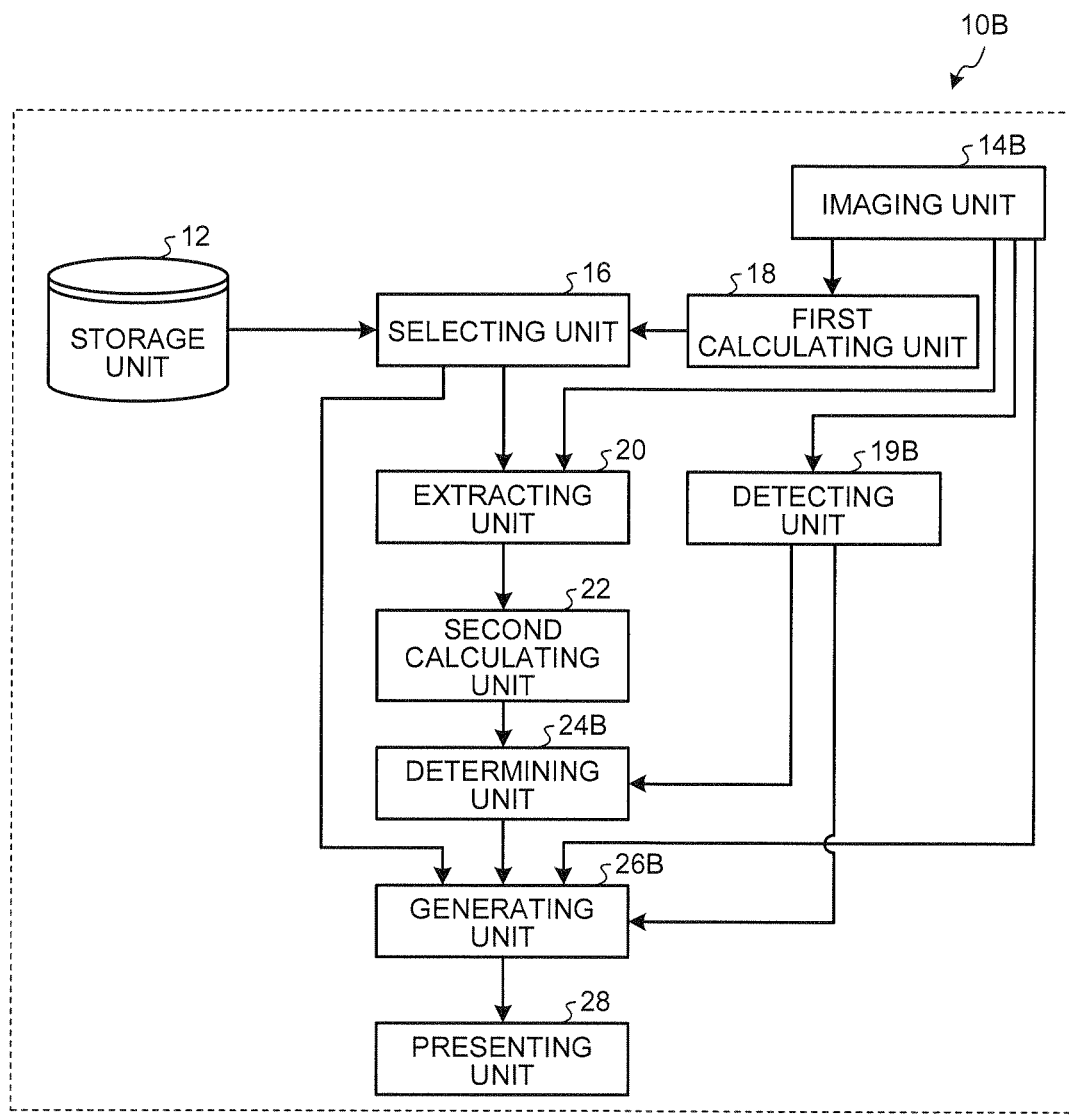
FIG. 8 is a block diagram illustrating an image processing device according to a second embodiment.

FIG. 8 is a block diagram illustrating a functional configuration of an image processing device 10B according to this embodiment. The image processing device 10B includes a storage unit 12 (storing unit), an imaging unit 14B (imaging unit), a selecting unit 16 (selecting unit), a first calculating unit 18 (first calculating unit), a detecting unit 19B (detecting unit), an extracting unit 20 (extracting unit), a second calculating unit 22 (second calculating unit), a determining unit 24B (determining unit), a generating unit 26B (generating unit) and a presenting unit 28 (presenting unit).

Parts that have the same functions as in the image processing device 10 according to the first embodiment will be designated by the same reference numerals and detailed description thereof will not be repeated. The image processing device 10B differs from the first embodiment in including the imaging unit 14B, the detecting unit 19B, the determining unit 24B and the generating unit 26B.

The imaging unit 14B captures a subject to try clothing on and acquires a plurality of first images captured at different imaging time. The first images may be a plurality of static images captured by the imaging unit 14B at predetermined times or may be frames constituting a moving image captured by the imaging unit 14B.

The imaging unit 14B sequentially outputs the acquired first images to the first calculating unit 18, the extracting unit 20, the detecting unit 19B and the generating unit 26B each time a first image is acquired by capturing.

The detecting unit 19B detects that the subject has moved since the previous capturing from the first images sequentially received from the imaging unit 148. The detection that the subject has moved is performed by the following method. The detecting unit 19B calculates a first feature from a first contour in the first image in the same manner as the extracting unit 20 in the first embodiment for each of the first images successive in time series. Then, the detecting unit 19B further calculates a second difference representing a difference between the first features of the first images successive in time series. When the second difference is a predetermined value representing that the subject has moved or larger, the detecting unit 19B detects that the subject has moved.

Upon detecting that the subjects has moved, the detecting unit 19B transmits the calculated second difference to the determining unit 24B. The detecting unit 19B also outputs a signal indicating that the subject has moved and the current first image with which the motion is detected (the current first image used for calculating of the second difference) to the generating unit 26B.

The determining unit 24B performs the same process as the determining unit 24 in the first embodiment and further determines a transparency that is higher as the second difference is larger. Specifically, the determining unit 24B stores in advance a calculation formula for calculating a transparency that is higher as the second difference is larger or a table defining the second difference and the transparency. The determining unit 24B then calculates the transparency by substituting the second difference into the calculation formula or reads the transparency associated with the second difference to determine the transparency. The determining unit 24B then outputs the determined transparency to the generating unit 26B.

The generating unit 26B performs the same process as the generating unit 26 in the first embodiment. Upon receiving the second difference from the detecting unit 19B, the generating unit 26B also changes the transparency of the second image information received from the selecting unit 16 to the transparency received from the determining unit 24B. The generating unit 26B then combines the second image of the second image information with the changed transparency with the current first image with which the motion is detected (the current first image used for calculation of the second difference) to generate a composite image. The generating unit 268 then outputs the generated composite image to the presenting unit 28.

Next, image processing performed by the image processing device 10B according to this embodiment will be described.

The image processing device 10B performs the same processing as the image processing in the first embodiment (see FIG. 5). The image processing device 10B further performs interrupt processing illustrated in FIG. 9 at every predetermined time. FIG. 9 is a flowchart illustrating procedures of the interrupt processing performed by the image processing device 108.

The detecting unit 19B determines whether or not the subject has moved (step S200). If it is not detected that the subject has moved (No in step S200), this routine is terminated. If the detecting unit 19B detects that the subject has moved (Yes in step S200), on the other hand, the detecting unit 19B outputs the second difference representing a difference between the first features of the first images successive in time series with which the motion is detected to the determining unit 24B (step S204).

Next, the determining unit 24B determines a transparency that is higher as the second difference is larger (step S206). Upon receiving the second difference from the detecting unit 19B, the generating unit 268 changes the transparency of the second image information received from the selecting unit 16 to the transparency received from the determining unit 24B. The generating unit 26B then combines the second image of the second image information with the changed transparency with the current first image with which the motion is detected (the current first image used for calculation of the second difference) to generate a composite image (step S208).

The presenting unit 28 presents the composite image generated in step S208 (step S210).

Figure 10A:
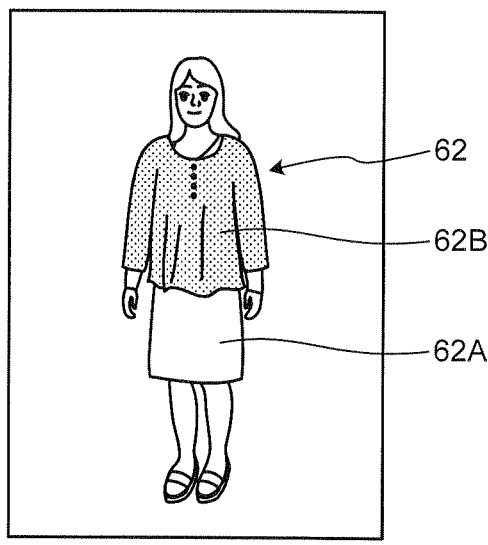
FIGS. 10A and 10B are diagrams of an example of a composite image according to the second embodiment.
Figure 10B:
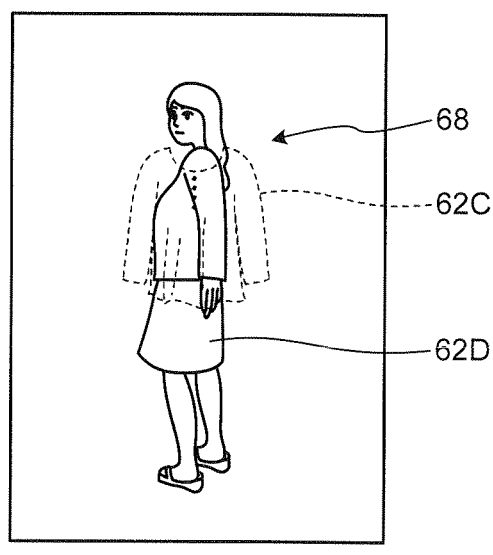

FIGS. 10A and 10B illustrate an example of the composite image in the image processing device 10B in this embodiment.

It is assumed, for example, that the first image captured by the imaging unit 14B is a first image 62A acquired by capturing the subject from the front as illustrated in FIG. 10A and that the second image information selected by the selecting unit 16 is a second image 62B acquired by capturing the second image from the front as illustrated in FIG. 10A. It is also assumed that the first difference calculated by the second calculating unit 22 is a value associated with a transparency "0" (the minimum value of the transparency). It is also assumed that the transparency of the first image acquired by capturing by the imaging unit 14B is a transparency "0". In this case, the image processing device 10B generates a composite image 62 in which the second image with the transparency "0" is superimposed on the first image with the transparency "0", for example, by performing the image processing described above, and presents the composite image 62 on the presenting unit 28 (see FIG. 10A).

When the detecting unit 19B detects that the subject has moved, the detecting unit 19B determines a transparency that is higher as the second difference calculated from the first image 62A (see FIG. 10A) and a first image 62D (see FIG. 10B) that are successive in time series. It is assumed for example that the subject has moved quickly from a state facing the front (the first image 62A) to a state facing the side (the first image 62D). It is also assumed that the second difference at this time is a value corresponding to the transparency "1" (the maximum value of the transparency). In this case, the image processing device 10B generates a composite image 68 in which a second image 62C with the transparency "1" is superimposed on the first image 62D with the transparency "0" by performing the interrupt processing illustrated in FIG. 9, and presents the composite image 68 on the presenting unit 28 (see FIG. 10B). Accordingly, the second image 62C is not presented but the first image 62D is presented in the composite image 68 as illustrated in FIG. 10B.

As described above, the image processing device 10B according to this embodiment acquires a plurality of first images captured at different times, and further adjusts the transparency of the second image information according to the second difference between the first features of successive first images when it is determined that the subject has moved.

As a result, a composite image that looks more natural can be presented in addition to the effects obtained in the first embodiment.

Third Embodiment

In this embodiment, a case, in which a creating unit that creates second image information and a second feature is further provided, will be described.

Figure 11:
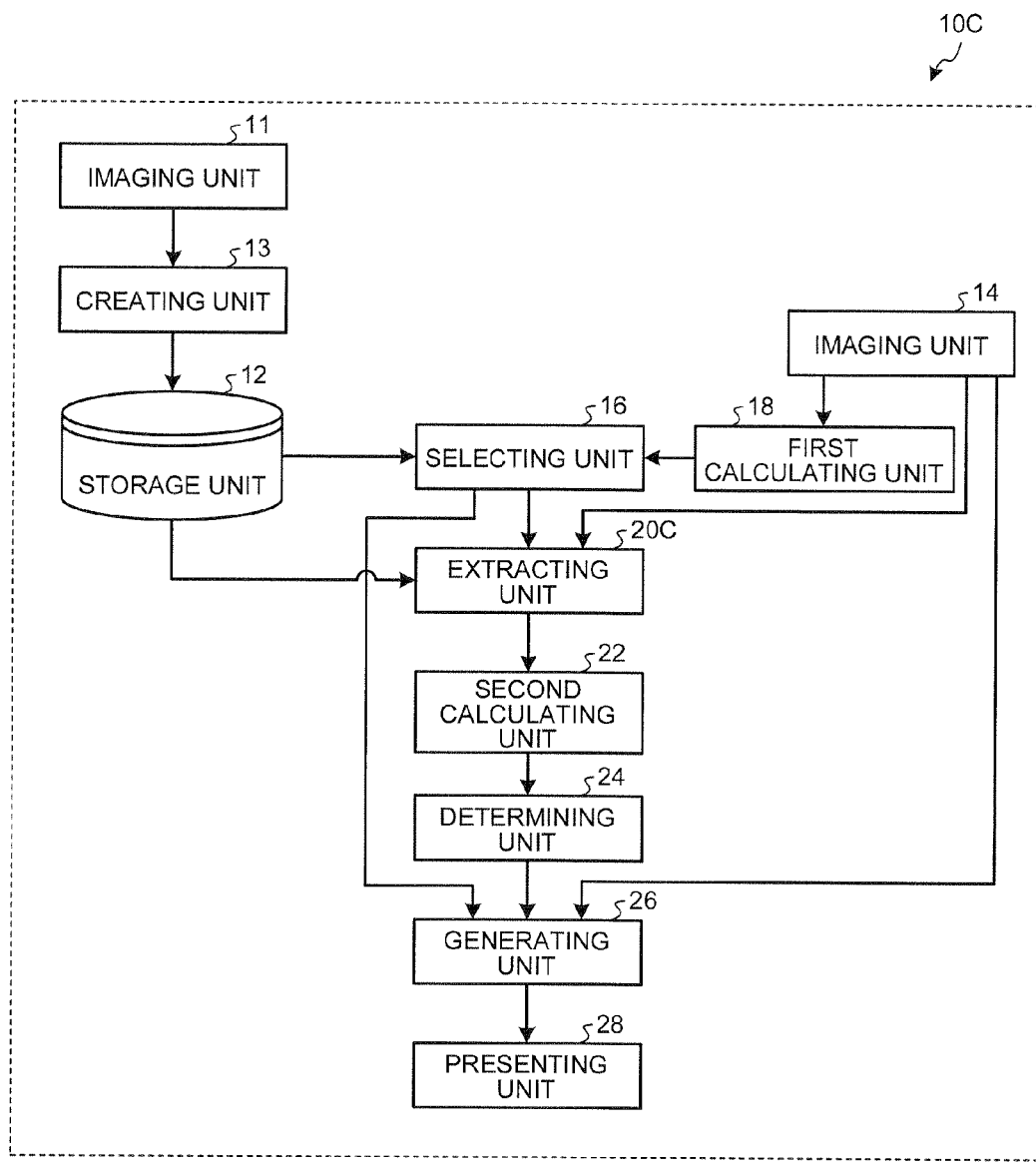
FIG. 11 is a block diagram illustrating an image processing device according to a third embodiment.

FIG. 11 is a block diagram illustrating a functional configuration of an image processing device 10C according to this embodiment. The image processing device 10C includes a storage unit 12 (storing unit), an imaging unit 14 (imaging unit), a selecting unit 16 (selecting unit), a first calculating unit 18 (first calculating unit), an extracting unit 20C (extracting unit), a second calculating unit 22 (second calculating unit), a determining unit 24 (determining unit), a generating unit 26 (generating unit) and a presenting unit 28 (presenting unit). The image processing device 10C further includes an imaging unit 11 and a creating unit 13.

Parts that have the same functions as in the image processing device 10 according to the first embodiment will be designated by the same reference numerals and detailed description thereof will not be repeated. The image processing device 10C differs from the first embodiment in further including the imaging unit 11 and the creating unit 13 in addition to the configuration of the image processing device 10 (see FIG. 1) of the first embodiment. Moreover, the image processing device 10C is different from the image processing device 10 in including the extracting unit 20C instead of the extracting unit 20.

The imaging unit 11 images clothing and acquires image information including a second image. The imaging unit 11 outputs the acquired image information to the creating unit 13.

A known digital camera, digital video camera or the like may be used as the imaging unit 11. Although a case where the imaging unit 11 that captures clothing and the imaging unit 14 that captures the subject are separately provided is described in this embodiment, these imaging units may be integrally provided. In other words, the imaging unit 14 may further capture clothing and output image information including the second image to the creating unit 13.

The creating unit 13 extracts the second image included in the image information received from the imaging unit 11 and generates second image information of the second image. The creating unit 13 also extracts a second contour from the second image and extracts a second feature from the second contour. The extraction of the second contour and the extraction of the second feature are performed in the same manner as the extracting unit 20 described in the first embodiment. The creating unit 13 also calculates posture information from the second image information in the same manner as the first calculating unit 18.

The creating unit 13 stores the second image information, clothing information including the second feature, the posture information in association with a clothing number in a table in the storage unit 12 (also see FIG. 2).

Accordingly, the storage unit 12 stores a table storing the clothing number, the posture information, the second image information and the clothing information in association with one another. The storage unit 12 further stores the second feature as the clothing information in addition to the information such as the name, the color, the size, the material and the price described in the first embodiment.

It is assumed here that the clothing has a shape that does not cover the entire shoulder of the subject when the clothing is worn by the subject. In other words, it is assumed that the clothing has a shape covering part of the shoulder of the subject. In this case, the imaging unit 11 preferably captures the subject that is to try the clothing on or the clothing in a state tried on a dummy such as a mannequin that is a model of the subject. In this case, the creating unit 13 extracts the second image included in an image of the image information received from the imaging unit 11 and an image (referred to as a first image) representing the subject or the dummy, extracts a second contour from the second image and the first image, and extracts a second feature from the second contour.

The extracting unit 20C performs the same process as the process performed by the extracting unit 20 described in the first embodiment. The extracting unit 20C differs from the extracting unit 20 in extracting the second feature of the second image information by reading a second feature associated with the second image information selected by the selecting unit 16 from the storage unit 12.

Next, clothing information generation processing performed by the image processing device 100 according to this embodiment will be described.

The image processing device 100 performs the same processing as the image processing in the first embodiment (see FIG. 5). In addition, the image processing device 10C performs the clothing information generation processing illustrated in FIG. 12 before performing the image processing or as interrupt processing during the image processing.

Figure 12:
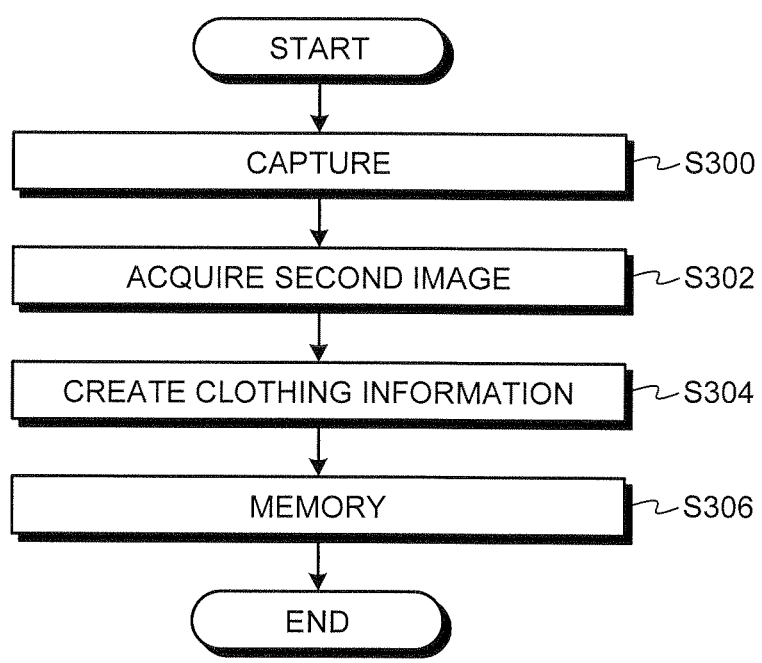
FIG. 12 is a flowchart of clothing information generation processing according to the third embodiment.

FIG. 12 is a flowchart illustrating procedures of the clothing information generation processing performed by the image processing device 100.

The imaging unit 11 captures clothing and acquires image information including a second image (step S300, step S302). Next, the creating unit 13 generates clothing information and also generates posture information (step S304). Next, the creating unit 13 stores the second image information, the clothing information including the second feature and the posture information in association with a clothing number in a table in the storage unit 12 (step S306).

As described above, the image processing device 100 of this embodiment includes the creating unit 13 that creates the second image information and also the second feature. Accordingly, image processing can be performed efficiently.

As a result, a composite image that looks more natural can be presented in addition to the effects obtained in the first embodiment.

Moreover, the creating unit 13 of the image processing device 100 according to this embodiment extracts the second image and the first image representing the subject or the dummy from the image obtained by imaging the subject of the clothing worn by the dummy that is a model of the subject as described above. The creating unit 13 then extracts the second contour from the second image and the first image, and extracts the second feature from the second contour.

Figure 13A:
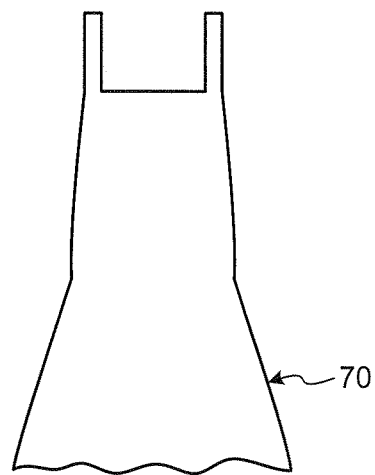
FIGS. 13A and 13B are diagrams of an example of a second image according to the third embodiment.
Figure 13B:
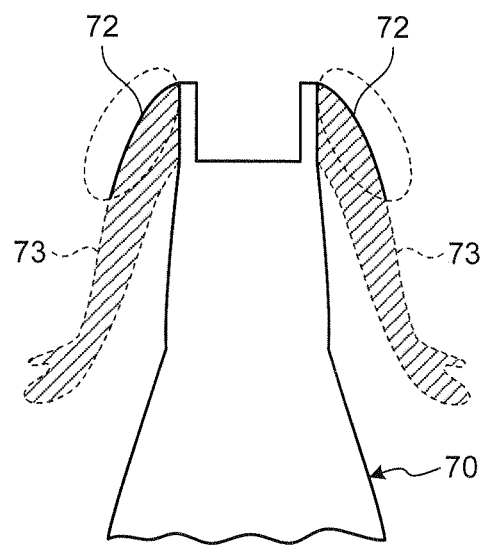

Accordingly, it is possible to extract a first feature including a shoulder 72 from a second image 70 and a first image 73 representing the subject as illustrated in FIG. 13B even when the second image of the clothing to be tried on is a second image 70 having a shape that does not cover the entire shoulder as illustrated in FIG. 13A. Accordingly, it is possible to reduce errors caused in the calculation of the first difference.

Although a case in which the creating unit 13 also generates the second feature in the image processing device 100 is described, the creating unit 13 may alternatively create the second image information and feature information and store them in the storage unit 12. The creating unit 13 may further store first image information of the first image in the storage unit 12. In this case, the extracting unit 20C extracts a second feature from the second image information selected by the selecting unit 16 and the first image information in the same manner as the extracting unit 20.

Fourth Embodiment

In this embodiment, an aspect ratio of at least one of a second image and a first image is adjusted according to an aspect ratio of a mirror reflecting the subject.

Figure 14:
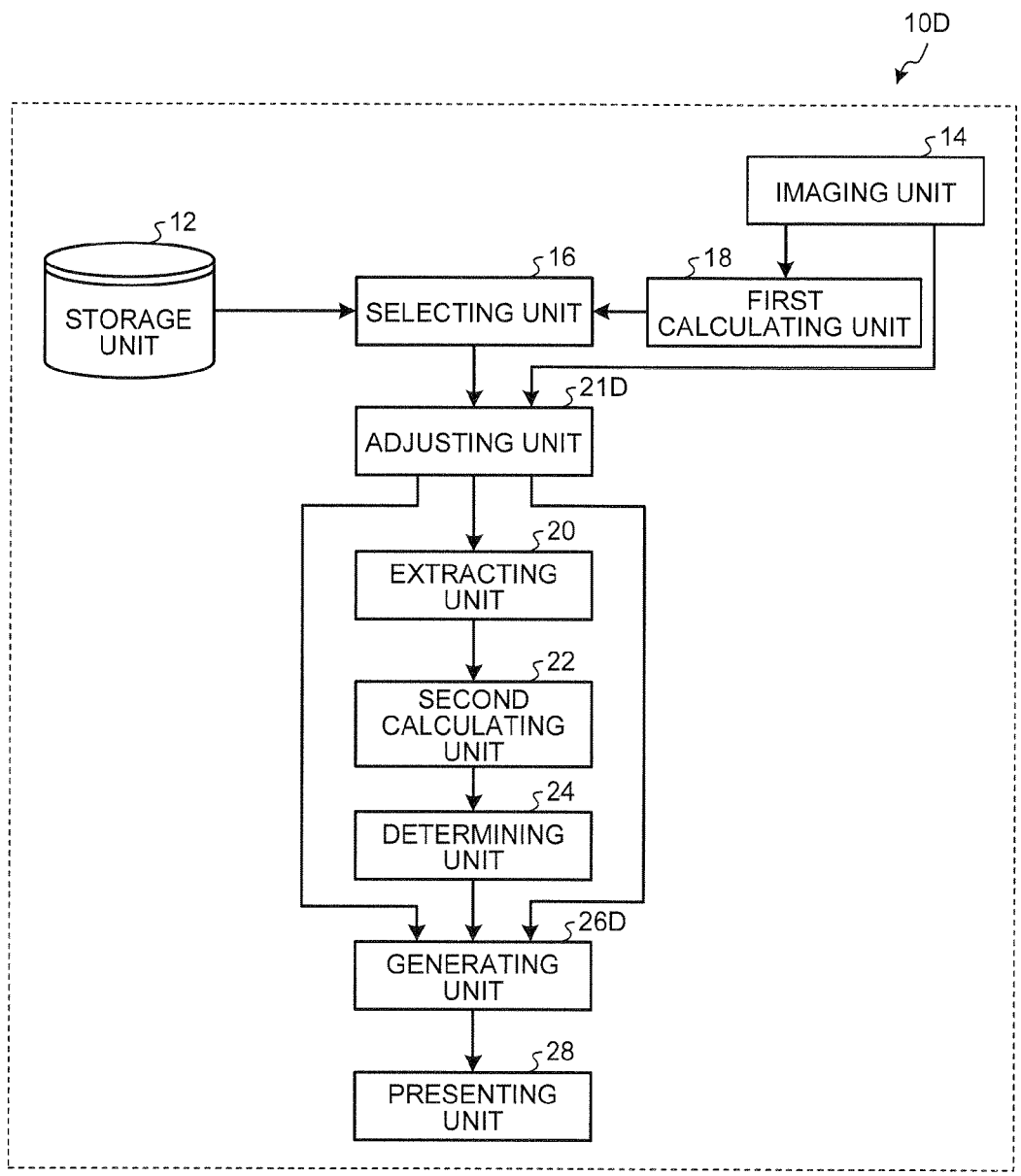
FIG. 14 is a block diagram of an image processing device according to a fourth embodiment.

FIG. 14 is a block diagram illustrating a functional configuration of an image processing device 10D according to this embodiment. The image processing device 10D includes a storage unit 12 (storing unit), an imaging unit 14 (imaging unit), a selecting unit 16 (selecting unit), a first calculating unit 18 (first calculating unit), an adjusting unit 21D (adjusting unit), an extracting unit 20 (extracting unit), a second calculating unit 22 (second calculating unit), a determining unit 24 (determining unit), a generating unit 26D (generating unit) and a presenting unit 28 (presenting unit).

Parts that have the same functions as in the image processing device 10 according to the first embodiment will be designated by the same reference numerals and detailed description thereof will not be repeated. The image processing device 100 differs from the first embodiment in further including the adjusting unit 21D and including the generating unit 26D instead of the generating unit 26.

The adjusting unit 21D stores in advance the aspect ratio of the mirror to reflect the subject. The adjusting unit 21D also adjusts at least one of the aspect ratio of the first image received from the imaging unit 14 and the aspect ratio of the second image received from the selecting unit 16.

The aspect ratio of the mirror represents a ratio of the maximum length in the height direction (vertical direction) of the mirror and the maximum length in the width direction (horizontal direction). The aspect ratio of the first image represents a ratio of the maximum length in the height direction (direction of gravitational force) of the subject in the first image and the maximum length in the width direction (horizontal direction) of the subject in the first image. The aspect ratio of the second image represents a ratio of the maximum length in the height direction (direction of gravitational force) of the clothing in the second image and the maximum length in the width direction (horizontal direction) of the clothing in the second image. The height direction of the clothing in the second image corresponds to the vertical direction (direction of gravitational force) of the clothing in a stated tried on by the subject. The width direction of the clothing in the second image corresponds to the horizontal direction of the clothing in a state tried on by the subject.

The image processing device 10D may include an operating unit, which is not illustrated. The operating unit may be a known input device for inputting various information such as a key board and a touch panel. Then, information representing whether or not to adjust the aspect ratios of the first image and the second image and the aspect ratios may be output from the operating unit to the adjusting unit 21D according to an operation instruction from the operating unit entered by the user.

When adjustment of the aspect ratios is instructed by the operation of the operating unit by the user, the adjusting unit 21D may adjust the aspect ratios to be the aspect ratios received from the operating unit.

The adjusting unit 21D outputs the first image and the second image with the adjusted aspect ratios to the extracting unit 20.

The generating unit 26D generates a composite image combining the first image with the aspect ratio adjusted by the adjusting unit 21D and the second image with the aspect ratio adjusted by the adjusting unit 21D and the transparency changed to the transparency determined by the determining unit 24, and outputs the composite image to the presenting unit 28. The generation of the composite image by the generating unit 26D is performed in the same manner as the generating unit 26 described in the first embodiment.

Next, image processing performed by the image processing device 10D according to this embodiment will be described.

Figure 15:
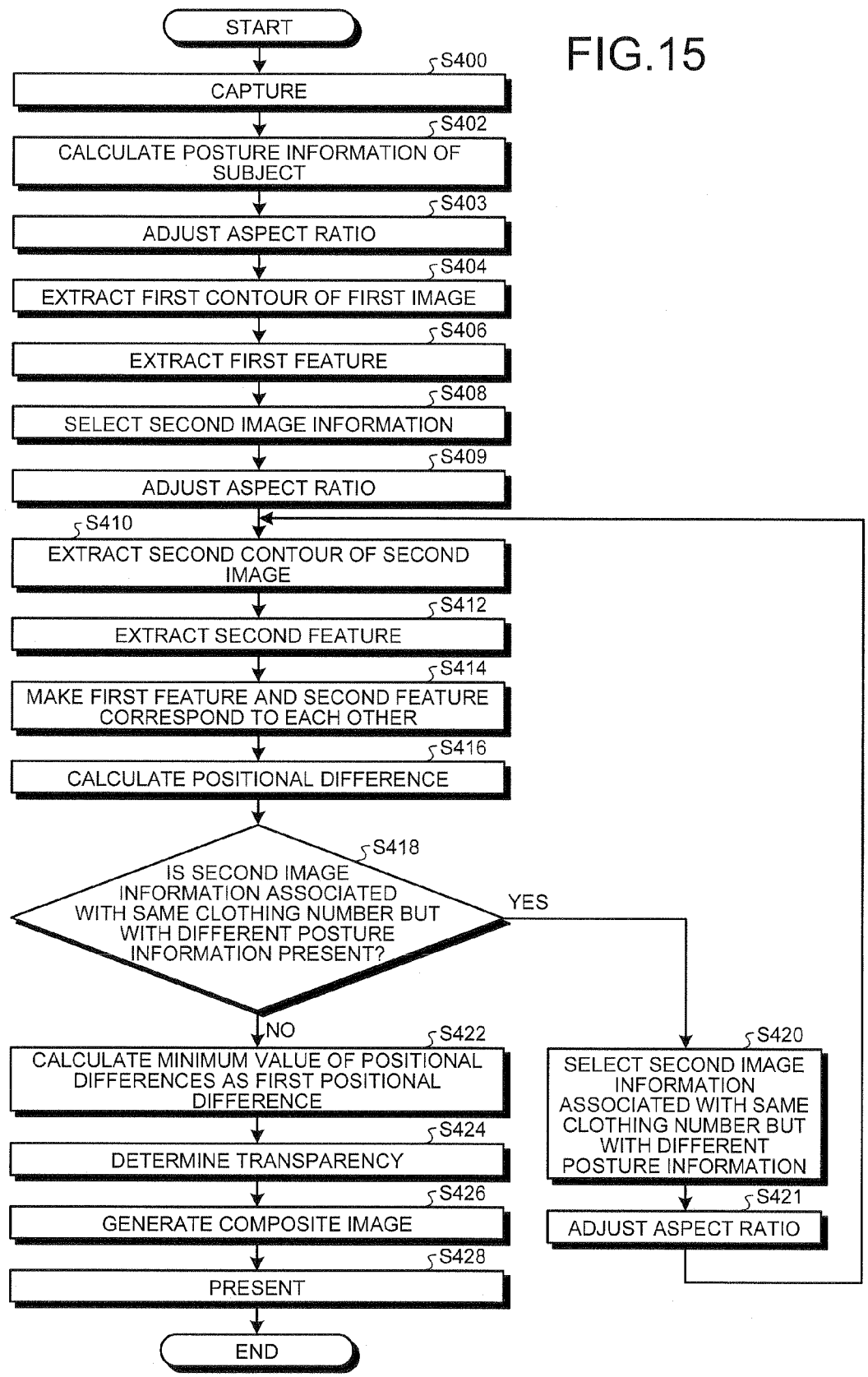
FIG. 15 is a flowchart of image processing according to the fourth embodiment.

FIG. 15 is a flowchart illustrating procedures of image processing performed by the image processing device 10D according to this embodiment. In FIG. 15, it is assumed that information representing the aspect ratio of the mirror and information representing execution of adjustment of both the aspect ratios of the first image and the second image are stored in advance in the adjusting unit 21D. Such information can be changed according to an operation instruction of the user to the operating unit, which is not illustrated, as described above.

First, the imaging unit 14 acquires a first image by capturing the subject (step S400). Next, the first calculating unit 18 calculates posture information of the subject from first image information of the first image acquired by capturing by the imaging unit 14 (step S402).

Next, the adjusting unit 21D adjusts the aspect ratio of the first image acquired in step S400 to the aspect ratio of the mirror to reflect the subject (step S403).

Next, the extracting unit 20 extracts a first contour of first image information with the aspect ratio adjusted by the process in step S403 by the adjusting unit 21D, and extracts a first feature from the first contour (step S404, step S406).

Next, the selecting unit 16 selects one piece of second image information associated with the posture information calculated in step S402 described above from the storage unit (step S408).

Next, the adjusting unit 21D adjusts the aspect ratio of the second image information selected in step S408 to the aspect ratio of the mirror to reflect the subject (step S409).

Next, the extracting unit 20 extracts a second contour in the second image information with the adjusted aspect ratio and extracts a second feature from the second contour (step S410, step S412).

Next, the second calculating unit 22 makes the first feature extracted in step S406 and the second feature extracted in step S412 correspond to each other, and calculates the minimum value of the differences calculated by corresponding the features to each other (enlargement, reduction or positional shift of the first feature and the second feature) (step S414, step S416).

Next, the second calculating unit 22 determines whether or not a piece of second image information for which the difference is not calculated and which is associated with the same clothing number as the second image information used for extraction of the second contour in step S410 described above but with different posture information is stored in the storage unit 12 (step S418). If a piece of second image information for which the difference is not calculated and which is associated with the same clothing number but with different posture information is stored, the second calculating unit 22 makes a positive determination (Yes in step S418). The second calculating unit 22 then selects one piece of second image information associated with the clothing number of the second image information used for extraction of the second contour in step S410 but with different posture information from the second image information from the storage unit 12 (step S420).

Next, the adjusting unit 21D adjusts the aspect ratio of the second image information selected in step S420 to the aspect value of the mirror to reflect the subject (step S421). Then, the process returns to step S410 described above.

If the second calculating unit 22 makes a negative determination in step S418 (No in step S418), the second calculating unit 22 calculates the minimum value of the differences calculated in the processes of steps S410 to S421 described above as a first difference (step S422).

Next, the determining unit 24 determines a transparency that is higher as the first difference is larger on the basis of the first difference calculated in step S422 (step S424).

Next, the generating unit 26D changes the transparency of the second image information after the aspect ratio adjustment associated with the second feature used for the calculation of the first difference calculated by the process of step S422 described above to the transparency determined in step S424. The generating unit 26D then generates a composite image combining the second image information with the changed aspect ratio and transparency and the first image information with the adjusted aspect ratio (step S426).

Next, the presenting unit 28 presents the composite image generated in step S426 (step S428).

The processes in steps S408 to S412 may be performed as interrupt processing interrupting during the processes of steps S400 to S406 at every predetermined time.

Figure 16A:
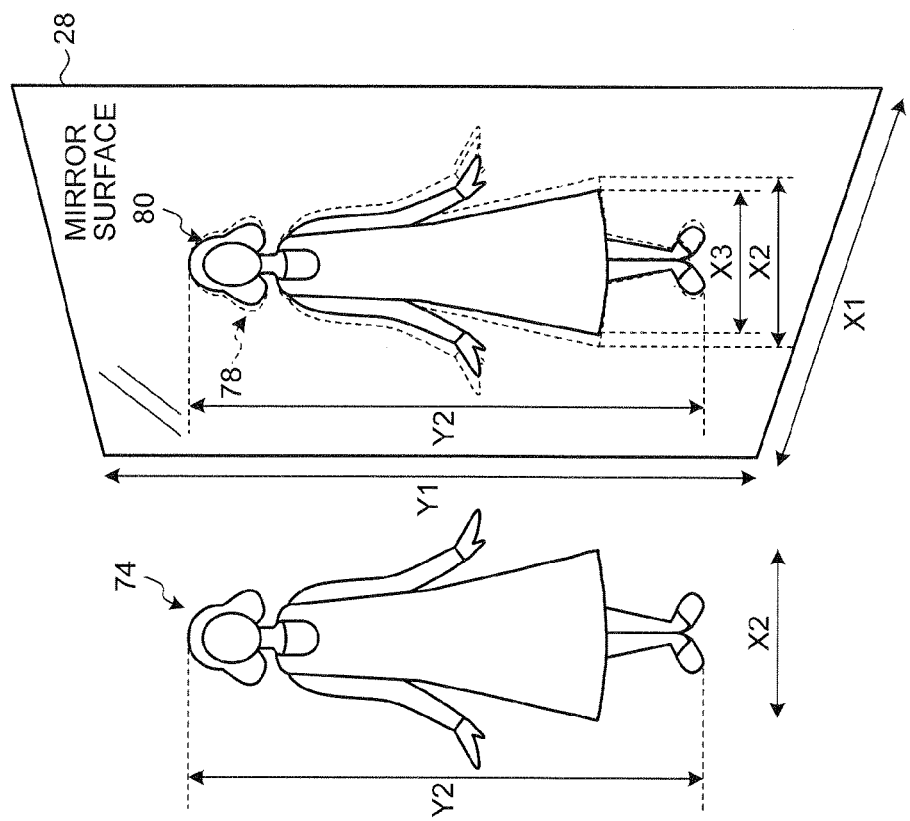
FIGS. 16A and 16B are diagrams of an example of a composite image according to the fourth embodiment.
Figure 16B:
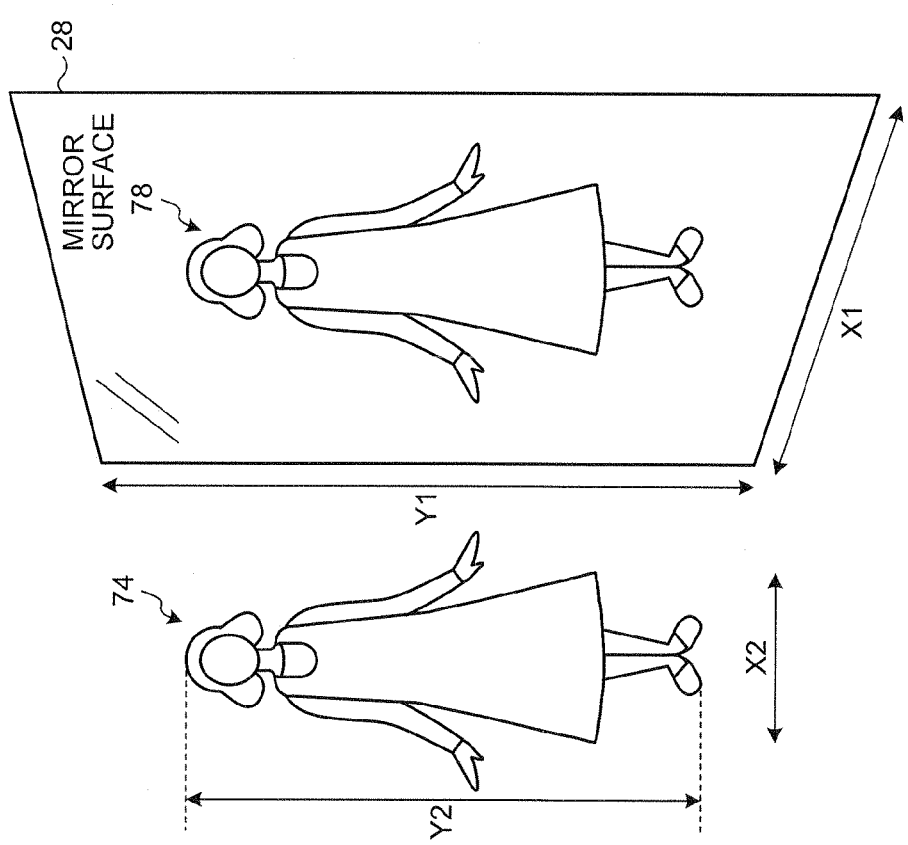

The image processing device 10D generates a composite image as illustrated in FIGS. 16A and 16B, for example, and presents the composite image on the presenting unit 28 by performing the image processing represented by steps S400 to S428 described above.

FIGS. 16A and 16B illustrate an example of image combining in the image processing device 10D according to this embodiment. If the adjustment of the aspect ratios is not performed, a composite image 78 in a state in which the aspect ratio (Y2:X2) of a subject 74 is different from the aspect ratio (Y1:X1) of a display (mirror) as the presenting unit 28 laminated on the mirror reflecting the subject 74 as illustrated in FIG. 16A, for example.

If the adjustment of the aspect ratios is performed, on the other hand, a composite image 80 in which the aspect ratio (Y2:X2) of the subject 74 is equal to the aspect ratio (Y1:X1) of the display (mirror) as the presenting unit 28 laminated on the mirror reflecting the subject 74 as illustrated in FIG. 16B, for example.

As a result, the image processing device 10D according to this embodiment can present a composite image that looks more natural in addition to the effects obtained in the first embodiment.

Figure 17:
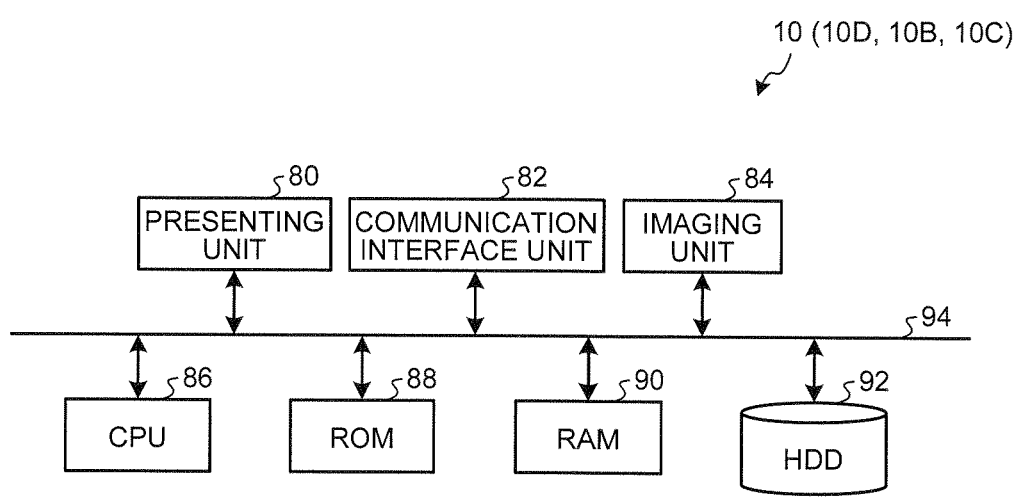
FIG. 17 is a diagram of a hardware configuration according to the embodiments.

Next, a hardware configuration of the image processing devices 10, 10B, 10C and 10D according to the first to fourth embodiments will be described. FIG. 17 is a block diagram illustrating an exemplary hardware configuration of the image processing device 10 according to the embodiment.

The image processing devices 10, 10B, 10C and 10D according to the first to fourth embodiments each include a presenting unit 80, a communication interface unit 82, an imaging unit 84, a central processing unit (CPU) 86, a read only memory (ROM) 88, a random access memory (RAM) 90, a HDD 92 and the like connected to one another by a bus 94, which is a hardware configuration using a computer system.

The CPU 86 is an arithmetic device configured to control the whole processing of the image processing device 10, 10B, 10C or 10D. The RAM 90 stores data necessary for various processes performed by the CPU 86. The ROM 88 stores programs and the like for implementing various processes performed by the CPU 86. The HDD 92 stores data to be stored in the respective storage units described above. The communication interface unit 82 is an interface for connecting to an external device or an external terminal via communication lines or the like, and transmitting/receiving data to/from the connected external device or external terminal. The presenting unit 80 corresponds to the presenting unit 28 described above. The imaging unit 84 corresponds to the imaging units 14, 11 and 14B described above.

Programs for implementing various processes described above performed by the image processing devices 10, 10B, 10C and 10D according to the first to fourth embodiments are embedded on the ROM 88 or the like in advance and provided therefrom.

Alternatively, the programs to be executed in the image processing devices 10, 10B, 10C and 10D according to the first to fourth embodiments may be recorded on a computer readable recording medium such as a CD-ROM, a flexible disk (FD), a CD-R and a digital versatile disk (DVD) in a form of a file that can be installed or executed, and provided therefrom.

Alternatively, the programs to be executed by the image processing devices 10, 10B, 10C and 10D according to the first to fourth embodiments may be stored on a computer system connected to a network such as the Internet, and provided by being downloaded via the network. Still alternatively, the programs to be executed by the image processing devices 10, 10B, 10C and 10D according to the first to fourth embodiments may be provided or distributed through a network such as the Internet.

The programs for implementing various processes performed by the image processing devices 10, 10B, 10C and 10D according to the first to fourth embodiments have modular structures including the respective units (the selecting unit 16, the first calculating unit 18, the extracting unit 20 (the extracting unit 20C), the second calculating unit 22, the determining unit 24 (the determining unit 24B), the generating unit 26 (the generating unit 26B, the generating unit 26D), the detecting unit 19B and the adjusting unit 21D) described above. In an actual hardware configuration, a CPU (a processor) reads the programs from a storage medium such as the ROM 88 and executes the programs, whereby the respective units described above are loaded on a main storage device and the selecting unit 16, the first calculating unit 18, the extracting unit 20 (the extracting unit 20C), the second calculating unit 22, the determining unit 24 (the determining unit 24B), the generating unit 26 (the generating unit 26B, the generating unit 26D), the detecting unit 19B and the adjusting unit 21D are generated on the main storage device.

Various information stored in the HDD 92, that is, various information stored in the storage unit 12 may be stored in an external device (such as a server). In this case, the external device and the CPU 86 may be connected via a network or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing device comprising a plurality of units implemented using a hardware processor, the units including:
   a first calculating unit configured to calculate posture information of a subject from a first image including the subject;
   a selecting unit configured to select a second image associated with the posture information from a plurality of second images including clothing;
   an extracting unit configured to extract a first feature of the subject from a first contour in the first image and extract a second feature from a second contour in the second image;
   a second calculating unit configured to calculate a first difference based on respective positions of the first feature and the second feature;
   a determining unit configured to determine a transparency that is higher as the first difference is larger; and
   a generating unit configured to generate a composite image combining the first image and the second image with the transparency changed to the determined transparency.

2. The device according to claim 1, wherein the units further include a detecting unit configured to detect a motion of the subject, and wherein
   the second calculating unit further calculates a second difference between the first features of first images that are successive in time series when the motion is detected, and
   the determining unit determines a transparency that is higher as the second difference is larger.

3. The device according to claim 1, wherein the extracting unit extracts at least one of a shoulder and a lower back of the subject as the first feature and the second feature.

4. The device according to claim 1, wherein
   the second calculating unit calculates the first difference for each of a plurality of linear regions into which each of the first feature and the second feature is divided, and
   the determining unit determines a transparency that is higher as the first difference in each of the linear regions is larger for each region including the linear region in the second image.

5. The device according to claim 1, further comprising storage configured to store the second image.

6. The device according to claim 5, wherein
   the storage stores in advance the second image and the second feature in association with each other, and
   the extracting unit extracts the second feature by reading the second feature associated with the second image.

7. The device according to claim 6, wherein the units further include a creating unit configured to create at least one of the second image and the second feature.

8. The device according to claim 1; further comprising a camera configured to capture a subject to acquire the first image.

9. The device according to claim 8, wherein the camera captures the clothing to acquire the second image.

10. The device according to claim 1, wherein the second image is an image acquired by capturing clothing in a state worn by the subject.

11. The device according to claim 1, wherein the units further include an adjusting unit configured to adjust an aspect ratio of at least one of the second image and the first image to an aspect ratio of a mirror to reflect the subject.

12. The device according to claim 1, further comprising an output device configured to output the composite image.

13. The device according to claim 1, wherein the extracting unit
 extracts the first contour in the first image and the second contour in the second image by edge extraction,
 extracts the first feature and the second feature according to curvatures of the first contour and the second contour, respectively, and
 enlarges at least one of the size of a filter used for the edge extraction and the size of an adjacent region used for the calculation of the curvature as the proportion of the first image in a captured image is larger.

14. An image processing method comprising:
 calculating posture information of a subject from a first image including the subject;
 selecting a second image associated with the posture information from a plurality of second images including clothing;
 extracting a first feature of the subject from a first contour in the first image;
 extracting a second feature from a second contour in the second image;
 calculating a first difference based on respective positions of the first feature and the second feature;
 determining a transparency that is higher as the first difference is larger; and
 generating a composite image combining the first image and the second image with the transparency changed to the determined transparency.

15. A computer program product comprising a non-transitory computer-readable medium including programmed instructions embodied therein for image processing, wherein the instructions, when executed by a computer, cause the computer to perform at least:
 calculating posture information of a subject from a first image including the subject;
 selecting a second image associated with the posture information from a plurality of second images including clothing;
 extracting a first feature of the subject from a first contour in the first image;
 extracting a second feature from a second contour in the second image;
 calculating a first difference based in respective positions of the first feature and the second feature;
 determining a transparency that is higher as the first difference is larger; and
 generating a composite image combining the first image and the second image with the transparency changed to the determined transparency.

16. The device according to claim 1, wherein the extracting unit
 extracts the first feature and the second feature according to curvatures of the first contour in the first image and the second contour in the second contour in the second image and according to depth information representing a depth of the subject.

17. An image processing device comprising a plurality of units implemented using a hardware processor, the units including:
 a first calculating unit configured to calculate posture information defined by a set of joint angles of a subject from a first image including the subject;
 a selecting unit configured to select a second image associated with the posture information from a plurality of second images including clothing;
 an extracting unit configured to extract a first feature of the subject from a first contour in the first image and extract a second feature from a second contour in the second image;
 a second calculating unit configured to calculate a first difference based on respective positions of the first feature and the second feature;
 a determining unit configured to determine a transparency that is higher as the first difference is larger; and
 a generating unit configured to generate a composite image combining the first image and the second image with the transparency changed to the determined transparency.

18. An image processing device comprising a plurality of units implemented using a hardware processor, the units including:
 a selecting unit configured to select a second image corresponding to a subject included in a first image;
 an extracting unit configured to extract a first feature of the first image and extract a second feature of the second image; and
 a generating unit configured to, when there is a difference between the first feature and the second feature, determine a transparency of the second image and combine the second image and the first image.

19. An image processing device comprising a plurality of units implemented using a hardware processor, the units including:
 a selecting unit configured to select a second image corresponding to a subject included in a first image; and
 a generating unit configured to, according to a motion of the subject, determine a transparency of the second image and combine the first image and the second image.

* * * * *